US011534896B2

(12) United States Patent
Suzuki et al.

(10) Patent No.: US 11,534,896 B2
(45) Date of Patent: Dec. 27, 2022

(54) ROTATION TOOL

(71) Applicant: Seiko Instruments Inc., Chiba (JP)

(72) Inventors: Makoto Suzuki, Chiba (JP); Jun Shinohara, Chiba (JP)

(73) Assignee: SEIKO INSTRUMENTS INC., Chiba (JP)

( * ) Notice: Subject to any disclaimer, the term of this patent is extended or adjusted under 35 U.S.C. 154(b) by 71 days.

(21) Appl. No.: 17/122,237

(22) Filed: Dec. 15, 2020

(65) Prior Publication Data
US 2021/0187704 A1 Jun. 24, 2021

(30) Foreign Application Priority Data

Dec. 19, 2019 (JP) .............................. JP2019-228929

(51) Int. Cl.
*B25B 15/02* (2006.01)
*B25B 23/00* (2006.01)
*B25G 1/02* (2006.01)
*B25B 13/48* (2006.01)

(52) U.S. Cl.
CPC ............ *B25B 15/02* (2013.01); *B25B 13/481* (2013.01); *B25B 23/0021* (2013.01); *B25G 1/025* (2013.01)

(58) Field of Classification Search
CPC ... B25B 15/02; B25B 13/481; B25B 23/0021; B25G 1/025; A61B 17/8897; A61B 17/8875
USPC ........................................................ 81/177.6
See application file for complete search history.

(56) References Cited

U.S. PATENT DOCUMENTS

| 1,000,900 | A | * | 8/1911 | Dorsey | ................. B25B 13/463 81/177.4 |
| 5,529,495 | A | | 6/1996 | Edwards | |
| 5,941,139 | A | * | 8/1999 | Vodehnal | .............. B25B 13/481 81/177.6 |
| 7,025,770 | B2 | | 4/2006 | McGuire et al. | |

FOREIGN PATENT DOCUMENTS

| GB | 456639 A | 11/1936 |
| JP | S54-148094 U | 10/1979 |
| JP | H08-141923 A | 6/1996 |
| JP | 2019-155491 A | 9/2019 |

OTHER PUBLICATIONS

Office Action in Japan Application No. 2019-228929, including English translation, dated Jan. 5, 2021, 10 pages.
Extended European Search Report in Europe Application No. 20214976.1, dated May 4, 2021, 7 pages.

* cited by examiner

*Primary Examiner* — Joseph J Hail
*Assistant Examiner* — Caleb Andrew Holizna
(74) *Attorney, Agent, or Firm* — Crowell & Moring LLP

(57) ABSTRACT

The invention aims to provide a rotation tool enabling work without obstructing a view of an operator and facilitating fine-adjustment for the tool. A rotation tool includes a flexible shaft including a tool portion at one end and a grip portion at the other end; and a cylindrical exterior body including curved portion on at least a part thereof, wherein a spiral protrusion is formed on at least a part of the shaft and a spiral groove is formed on at least a part of the curved portion, and the shaft is configured to be movable inside the exterior body by screwing the spiral protrusion and the spiral groove to each other.

12 Claims, 17 Drawing Sheets

ROTATION TOOL

RELATED APPLICATIONS

This application claims priority to Japanese Patent Application No. 2019-228929, filed on Dec. 19, 2019, the entire content of which is incorporated herein by reference.

BACKGROUND OF THE INVENTION

1. Field of the Invention

The present invention relates to a rotation tool.

2. Description of the Related Art

In the related art, as a tool used for work involving rotational movements such as drilling, cutting, and screwing in a narrow work environment, a rotation tool has been devised in which a tool is provided on one side of a rotation shaft and a rotatable grip portion is provided on the other side of the rotation shaft (JP-A-H08-1.41923 (Patent Literature 1)).

However, in the rotation tool in the related art, there is a problem that the hand of an operator obstructs a field of view of the operator, which makes the work difficult.

In addition, there is a problem that fine adjustment for the tool, such as adjustment of a depth in a direction of the rotation shaft, may depend on a force of the operator, and thus high skill is required for extremely precise work.

SUMMARY OF THE INVENTION

The invention has been made in consideration of the above-mentioned problems of the rotation tool in the related art, and an object thereof is to provide a rotation tool enabling work without obstructing the view of the operator and facilitating fine-adjustment for the tool.

In order to achieve the above-mentioned object, a rotation tool according to the invention includes a flexible shaft including a tool portion at one end and a grip portion at the other end; and a cylindrical exterior body including a curved portion on at least a part thereof, wherein a spiral protrusion is formed on at least a part of the shaft and a spiral groove is formed on at least a part of the curved portion, and the shaft is configured to be movable inside the exterior body by screwing the spiral protrusion and the spiral groove to each other.

With this configuration, it is easy to avoid obstacles around a work area, and since a rotational movement can be transmitted without bringing the hand of the operator close to the work area, the hand of the operator would never become an obstacle. In addition, by screwing the shaft and the exterior body, a distance traveled in an axial direction when the shaft makes one rotation is determined, so that it is easy to fine-adjust a depth and the like even for an operator with no skill.

In addition, in the invention, a pitch in the spiral groove may increase as being far away from a center point of a curvature of the curved portion. According to this configuration, when the shaft moves along the curved portion, it is possible to respond to a change in the pitch occurring in the shaft curved together, and to smoothly move the shaft.

In addition, in the invention, when the spiral protrusion and the spiral groove are screwed to each other, respective threads facing each other may be formed at any same inclination angle. According to this configuration, when the shaft moves in the curved portion, the thread of the spiral protrusion provided on the shaft curved together and the thread of the spiral groove provided on the curved portion are screwed in parallel, so that the shaft can be moved smoothly.

In addition, in the invention, the tool portion may be formed to be detachable from the shaft. According to this configuration, the tool portion can be fixed to the shaft or the tool portions having different shapes can be attached to and detached from the shaft according to applications and the frequency of use, and the tool portion that cannot pass through the curved portion can also be used.

In addition, in the invention, the tool portion may be formed integrally with the shaft. According to this configuration, by integrally forming the tool portion having a required shape at the one end of the shaft, it is possible to provide the tool portion at a low cost.

In addition, in the invention, a stopper member configured to prevent a movement of the shaft may be provided on at least one of the shaft and the exterior body. According to this configuration, it is possible to adjust an amount of protrusion of the tool portion from the exterior body.

In addition, in the invention, a detachable holding member may be provided at any position on an outer circumference of the exterior body. According to this configuration, it is possible to prevent a change in the curvature of the exterior body and to stably hold the exterior body.

In addition, in the invention, the spiral groove may be formed from both ends of the exterior body to any length, and the spiral groove may not be provided in an intermediate portion of the exterior body. According to this configuration, frictional resistance can be reduced by reducing a screwed portion between the spiral groove and the spiral protrusion, so that the shaft can move smoothly.

According to the invention, it is possible to provide a rotation tool enabling work without obstructing the view of the operator and facilitating fine-adjustment for the tool.

DETAILED DESCRIPTION OF THE PREFERRED EMBODIMENTS

Hereinafter, embodiments of a rotation tool according to the invention will be described with reference to FIGS. 1 to 17. The dimensional ratio of respective components may differ from the actual one. The materials, dimensions, etc. exemplified in the following description are examples, and the invention is not limited thereto and can be carried out with appropriate modifications without changing the gist of the invention.

First Embodiment

A first embodiment of the invention will be described in detail below with reference to FIGS. 1 to 5 and FIGS. 15 to 17.

Overall Configuration of Rotation Tool

The overall configuration of a rotation tool according to the present embodiment will be described below.

Figure 1:
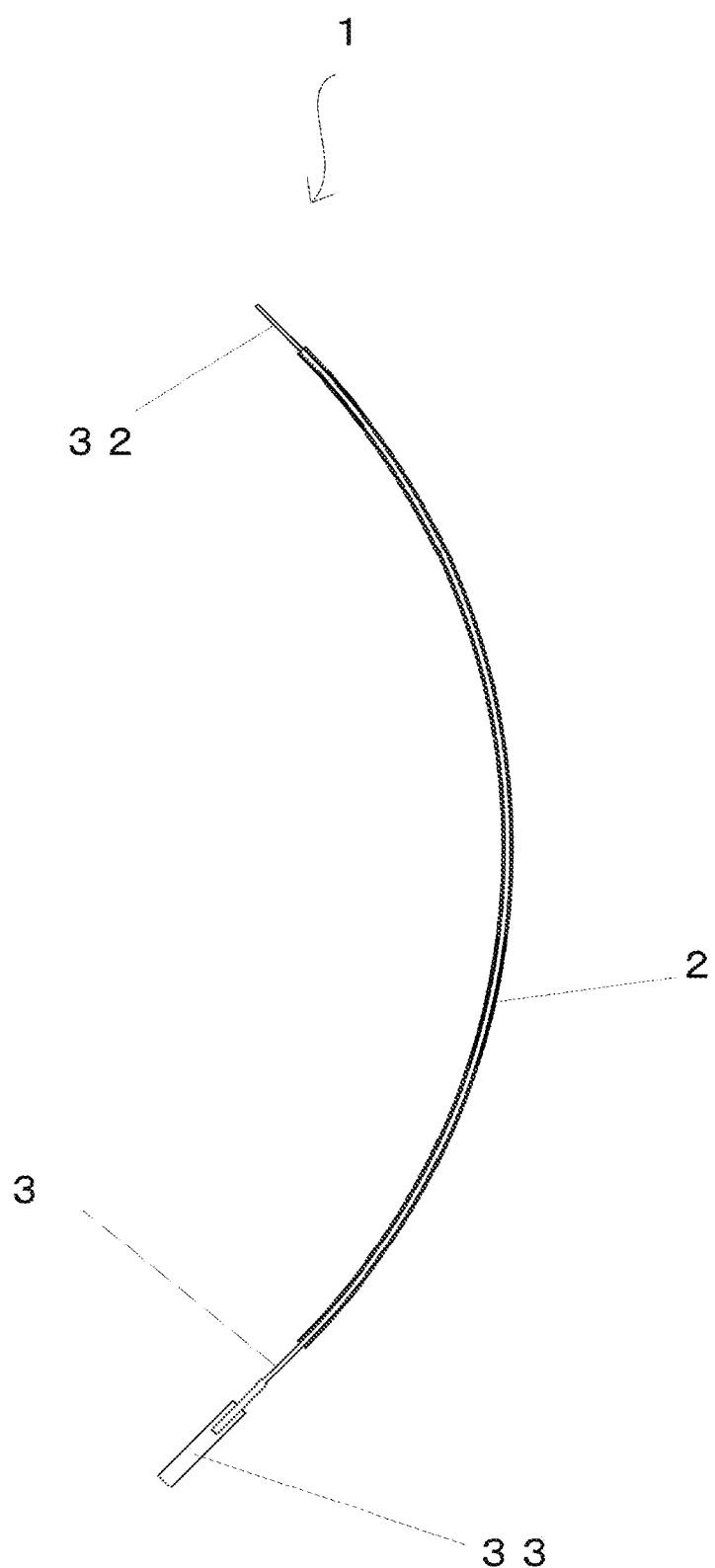
FIG. 1 is a diagram showing an entire rotation tool according to a first embodiment.
Figure 2:
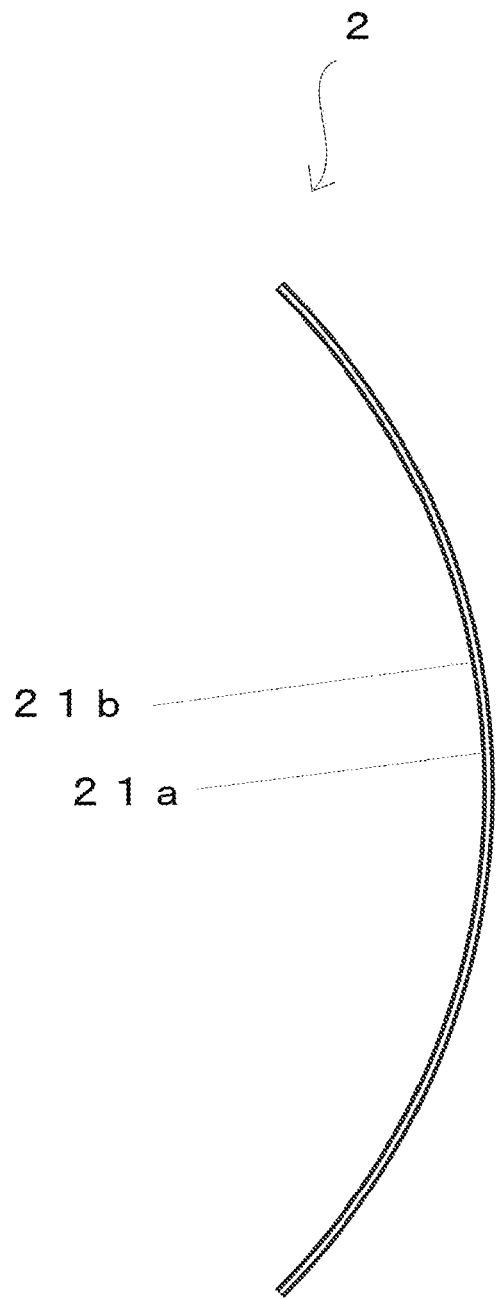
FIG. 2 is a diagram showing an entire exterior body according to the first embodiment.
Figure 3:
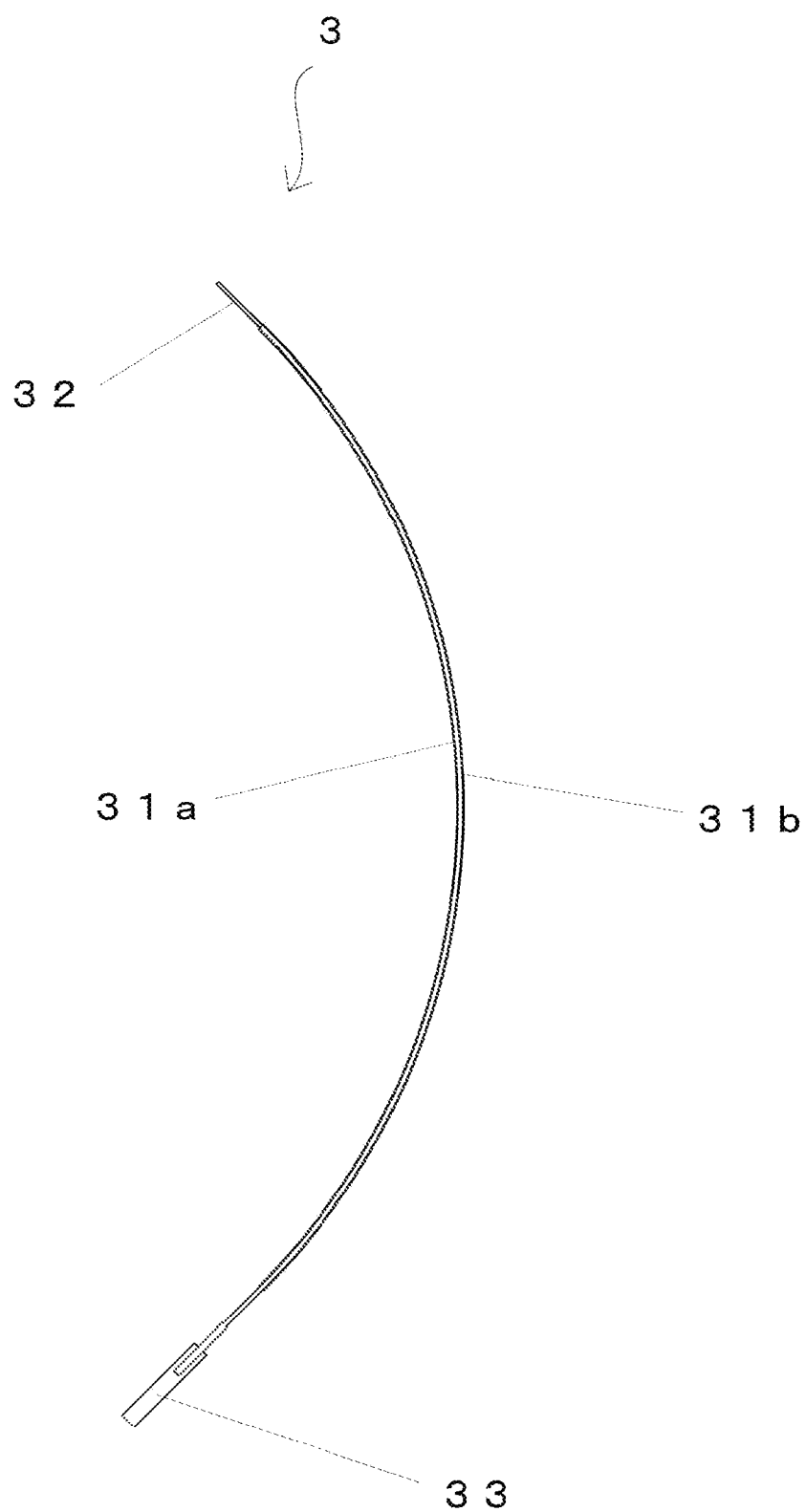
FIG. 3 is a diagram showing an entire shaft according to the first embodiment.
Figure 4A:
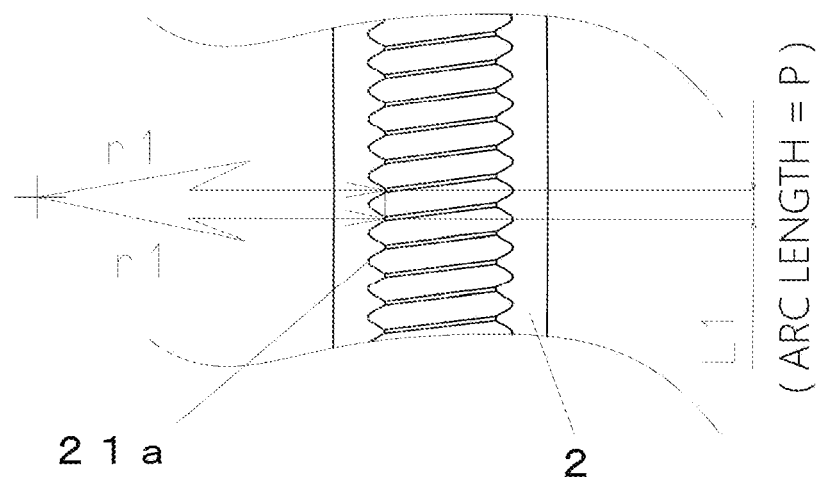
FIGS. 4A and 4B are diagrams showing cross sections of the exterior body according to the first embodiment.
Figure 4B:
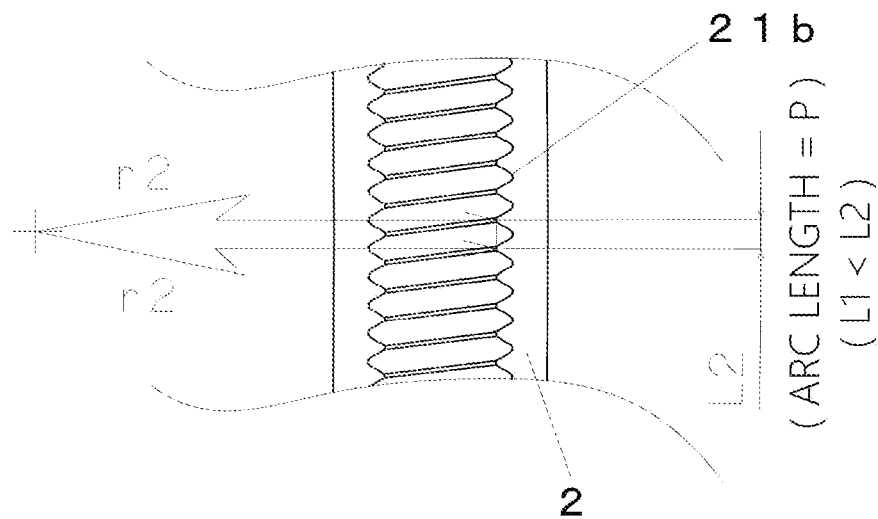
Figure 5:
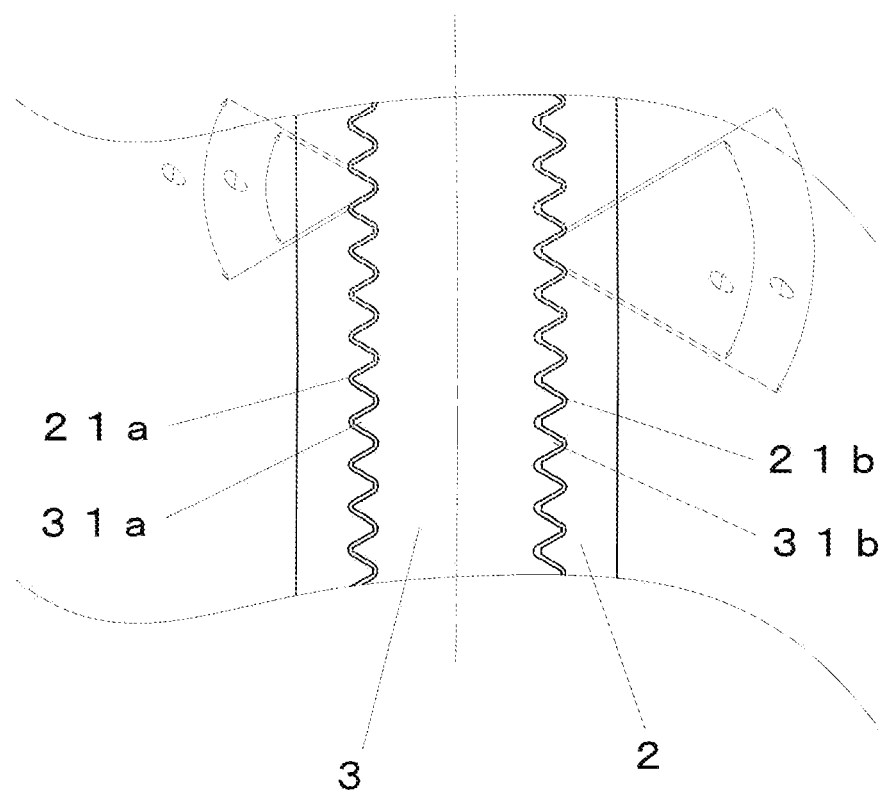
FIG. 5 is a diagram showing a screwed state of the exterior body and the shaft according to the first embodiment.

FIG. 1 shows a state of a rotation tool 1 according to the present embodiment in which an exterior body 2 and a shaft 3 are screwed to each other, and a tool portion 32 and a grip portion 33 protrude from the exterior body 2. In addition, FIG. 2 is a diagram showing the entire exterior body 2. In addition, FIG. 3 is a diagram showing the entire shaft provided with the tool portion 32 and the grip portion 33. In addition, FIGS. 4A and 4B are diagrams showing spiral grooves on a cylindrical inner surface of the exterior body 2. In addition, FIG. 5 is a diagram showing in detail a screwed state in which the exterior body 2 and the shaft 3 are screwed to each other.

As shown in FIGS. 1 to 3, the rotation tool 1 includes the exterior body 2 and the shaft 3.

In the present embodiment, in the rotation tool 1 shown in FIG. 1, a left side on the paper is a curvature center direction, a right side on the paper is a curvature outer circumference direction, an upper side on the paper is a tool portion direction, and a lower side on the paper is a grip portion direction.

In the rotation tool 1 according to the present embodiment, as shown in FIG. 1, the shaft 3 is screwed inside the exterior body 2, and the tool portion 32 and the grip portion 33 are configured to be able to protrude from the exterior body 2. Hereinafter, each configuration of the rotation tool 1 according to the present embodiment will be described.

Exterior Body

The exterior body 2 has a cylindrical shape including a curved portion on at least a part thereof, and as shown in FIGS. 4A and 4B, spiral grooves 21 are provided on an inner circumference of the exterior body 2 so as to be screwable with the shaft 3.

It is desirable that a length of the exterior body 2 is 20 times or more of an outer diameter of the exterior body 2, and the outer diameter is 10 mm or less. In addition, it is desirable that a curvature radius of the curved portion of the exterior body 2 is 40 times or more of the outer diameter of the exterior body 2.

The exterior body 2 is made of a metal or a resin, and it is desirable that a material having flexibility whose curvature can be changed within a range in which plastic deformation does not occur can be used for the exterior body 2. For example, it is desirable to use stainless steel, titanium, or brass as the metal, and POM, PPS, PC, or ABS resins, as the resin.

Accordingly, even when the curvature changes slightly due to a holding force of an operator during use of the rotation tool 1, the shaft 3 can be rotated without breaking.

However, the material, shape, and dimension of the exterior body 2 are not limited to the illustrated example, and may be appropriately changed in consideration of design, application, workability, and the like.

Shaft

As shown in FIG. 3, the shaft 3 is made of a flexible material and is provided with spiral protrusions 31 on at least a part of an outer circumference thereof (the spiral protrusions are not shown in FIG. 3).

In addition, the tool portion 32 is provided at one end of the shaft 3, and the grip portion 33 for holding the shaft is provided at the other end of the shaft 3.

The shaft 3 is made of, for example, a resin material, a metal material, or a combination of these materials as appropriate. However, the shape of the shaft 3 is not limited to the shape shown in the illustrated example, and may be changed as appropriate in consideration of design and size.

The shaft 3 is made of a metal or a resin, and it is desirable that a material having flexibility whose curvature can be changed within a range in which plastic deformation does not occur can be used for the shaft 3.

Accordingly, the shaft 3 traveling while rotating can pass through the curved portion without breaking.

Configuration of Spiral Grooves

As shown in FIGS. 4A and 4B, the spiral grooves 21 are provided on a part of an inner circumference of the curved portion of the exterior body 2. When the curvature of the curved portion is defined as r and an arc length is defined as P, a spiral groove closest to the curvature center direction is defined as a spiral groove 21a, and a pitch length thereof is defined as L1. Similarly, a spiral groove farthest from the curvature center direction is defined as a spiral groove 21b, and a pitch length thereof is defined as L2.

In the rotation tool 1 according to the present embodiment, it is desirable that the pitch length L1 of the spiral groove 21a is smaller than the pitch length L2 of the spiral groove 21b.

Configuration of Spiral Protrusions

As shown in FIG. 5, the spiral protrusions 31 are provided on a part of the outer circumference of the shaft 3. A spiral protrusion closest to the curvature center direction is defined as a spiral protrusion 31a, and a pitch thereof is defined as M1. Similarly, a spiral protrusion farthest from the curvature center direction is defined as a spiral protrusion 31b, and a pitch thereof is defined as M2 (M1 and M2 are not shown in FIG. 5).

In the rotation tool 1 according to the present embodiment, it is desirable that the spiral protrusion 31a and the spiral protrusion 31b are arranged so that the pitch lengths M1 and M2 are the same, and that M1 is equal to M2 in the state of the shaft 3 alone which is not screwed with the exterior body 2.

Operation when Shaft Moves in Exterior Body

When the shaft 3 moves in the exterior body 2 including the curved portion, the shaft 3 is also curved according to the curvature of the curved portion. Since an arc length on a curvature center side is different from an arc length on a curvature outer circumference side, the pitch length of the spiral protrusions 31 is shorter at the spiral protrusion 31a in the center curvature direction and is longer at the spiral protrusion 31b in the curvature outer circumference direction. That is, the pitch length M1 is smaller than the pitch length M2.

In the present embodiment, spiral grooves 21 satisfying L1<L2 are formed on the exterior body 2 so as to correspond to the change in the pitch lengths of the spiral protrusion 31a and the spiral protrusion 31b.

Accordingly, since the pitches when the spiral grooves and the spiral protrusions are screwed to each other can be made the same over the entire circumference, when the shaft 3 is rotated, all sliding portions of the spiral grooves and the spiral protrusions are in contact with each other or have a very small gap therebetween.

Therefore, when stress is concentrated on the sliding portions that are in contact with each other, the spiral grooves 21 or the spiral protrusions 31 are slightly deformed, and when other spiral grooves 21 and other spiral protrusions 31 come into contact with each other, the stress can be dispersed and the resistance of the sliding portions can be reduced, so that the shaft 3 can move smoothly in the exterior body 2 while rotating.

Desirable Screwed State

As shown in FIG. 5, in the present embodiment, when the exterior body 2 and the shaft 3 are screwed to each other, it is desirable that the spiral grooves 21 and the corresponding spiral protrusions 31 that slide and face each other are formed at any same inclination angle. In addition, it is desirable that respective angles of the spiral grooves 21 and the spiral protrusions 31 are 15 degrees to 90 degrees.

Accordingly, when the shaft 3 is rotated while sliding along the spiral grooves 21 in the exterior body 2, frictional resistance between the spiral grooves 21 and the spiral protrusions 31 can be reduced and the shaft 3 can be smoothly rotated.

Tool Portion

Tip members that can be used in the tool portion 32 in the present embodiment will be described below with reference to FIGS. 15A to 15C to FIG. 17. The dimensional ratios and the like may differ from the actual ones. Furthermore, the materials, dimensions, shapes, etc. exemplified in the following description are examples, and the invention is not limited thereto and can be carried out with appropriate modifications without changing the gist of the invention.

Tools Used in Tool Portion

It is desirable that the tip member used in the tool portion 32 is a tool that acts by spiral motion. FIGS. 15A to 15C to FIG. 17 shows examples of available tools that act by the spiral motion in the present embodiment.

Figure 15A:
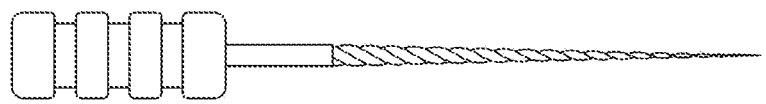
FIGS. 15A to 15C are diagrams showing examples of a spiral tool that can be used as the tool portion in each embodiment.
Figure 15B:
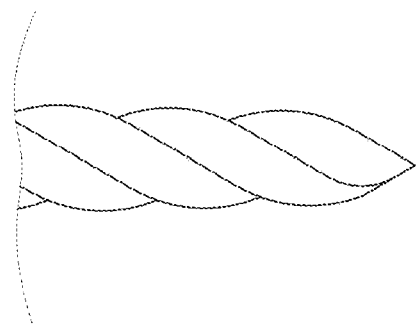
Figure 15C:
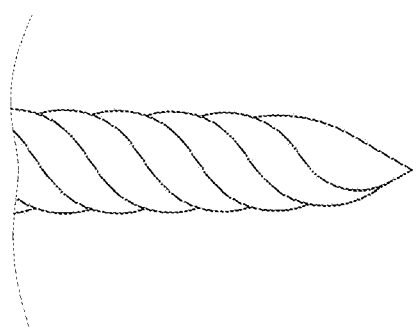

As shown in each diagram in FIGS. 15A, 15B and 15C, the tip member may be a spiral tool. FIG. 15A shows an example of a tool used for a dental root canal treatment in the related art. FIG. 15B is a diagram showing a tip shape of a reamer including a gentle spiral blade, which is a dental root canal treatment tool for enlarging and cleaning a root canal. FIG. 15C is a diagram showing a tip shape of a file, which is a spiral dental root canal treatment tool having a stronger twist than that of the reamer.

The spiral tools that can be used in the tool portion 32 are not limited to the dental root canal treatment tool, and also include spiral tools used for other applications such as a drill and an end mill.

Figure 16A:
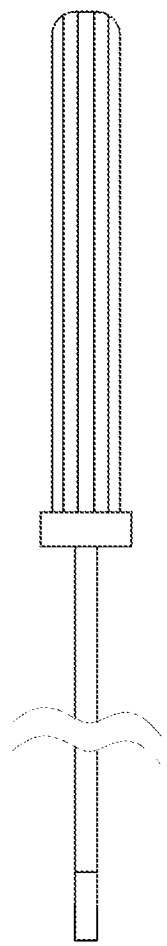
FIGS. 16A and 16B are diagrams showing examples of a driver tool that can be used as the tool portion in each embodiment.
Figure 16B:
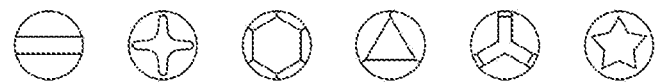

In addition, as shown in FIGS. 16A and 16B, the tip member may be a tool having a function of a tip member in a screwdriver. As shown in FIG. 16B, the tip member can be appropriately changed according to applications, and may be a plus sign, a minus sign, hexagon, etc., which are general recessed shapes of a screw head.

Figure 17:
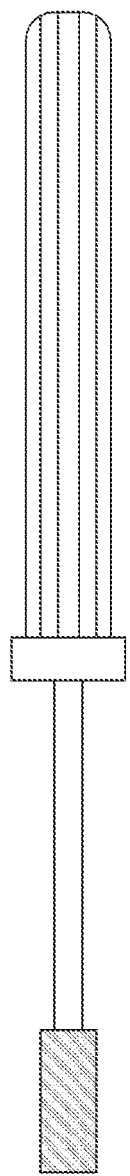
FIG. 17 is a diagram showing an example of a grinding tool that can be used as the tool portion in each embodiment.

In addition, as shown in FIG. 17, the tip member may be a tool having a function such as polishing. The tip member can be used as an extremely precise polishing tool by fixing abrasive grains such as diamond-like carbon (DLC) to a surface of a round bar-shaped tip member.

Each tip member described in the present embodiment is formed integrally with or separately from the shaft, and the shape thereof can be appropriately changed according to applications, dimensions, etc. without changing the gist of the invention.

Second Embodiment

Next, a second embodiment of the invention will be described in detail with reference to FIGS. 6 to 11. The items common to the first embodiment may be omitted.

Overall Configuration of Rotation Tool

The overall configuration of a rotation tool 10 according to the present embodiment will be described below.

Figure 6:
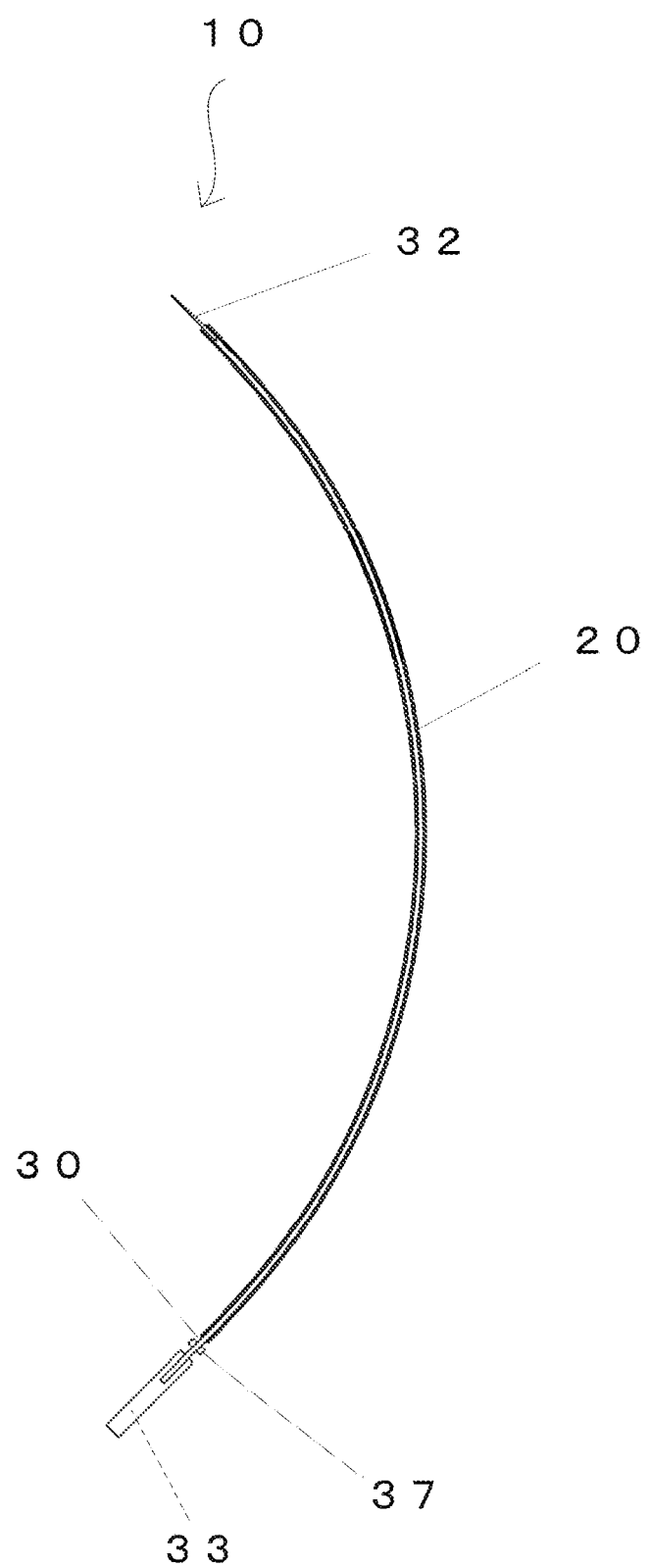
FIG. 6 is a diagram showing an entire rotation tool according to a second embodiment.

FIG. 6 shows a state of the rotation tool 10 according to the present embodiment in which an exterior body 20 and a shaft 30 are screwed to each other, and the tool portion 32, the grip portion 33, and a stopper member 37 protrude from the exterior body 20. In addition, FIGS. 7A and 7B are diagrams showing in detail a screwed state near the tool portion 32 and near the grip portion 33 when the exterior body 20 and the shaft 30 are screwed to each other.

As shown in FIG. 6, the rotation tool 10 includes the exterior body 20 and the shaft 30.

Exterior Body

Figure 7A:
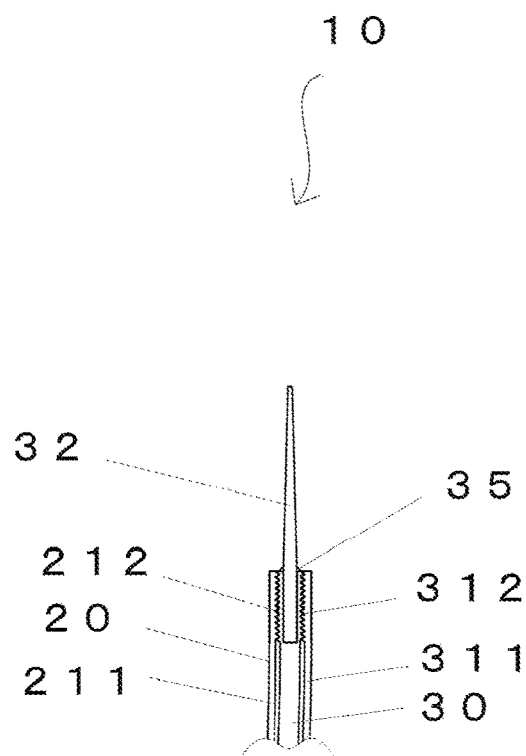
FIGS. 7A and 7B are diagrams showing cross sections of both ends of a rotation tool according to the second embodiment.
Figure 7B:
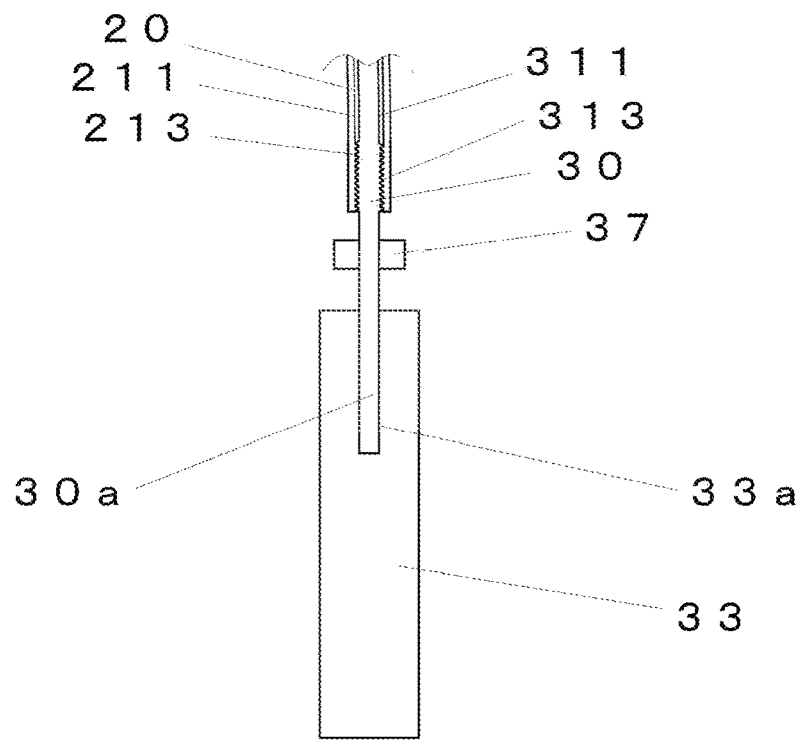

The exterior body 20 has a cylindrical shape including a curved portion on at least a part thereof, and as shown in FIGS. 7A and 7B, an inner circumference of the exterior body 20 includes an intermediate portion 211 not provided with spiral grooves, and spiral grooves 212 formed at any length from an end portion on a tool portion side and spiral grooves 213 formed at any length from an end portion on a grip portion side, which are disposed to be screwable with the shaft 30.

Shaft

As shown in FIGS. 7A and 7B, the shaft 30 includes an intermediate portion 311 not provided with spiral protrusions, and spiral protrusions 312 formed at any length on the tool portion side and spiral protrusions 313 formed at any length on the grip portion side, which are disposed to be screwable with the exterior body 20.

Figure 8:
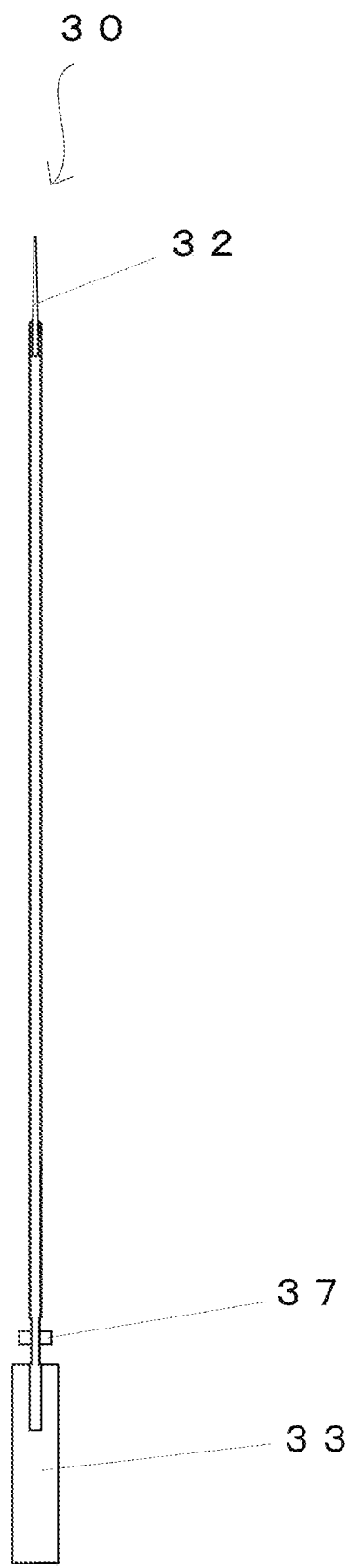
FIG. 8 is a diagram showing an entire shaft according to the second embodiment.

In addition, as shown in FIG. 8, the tool portion 32 is provided at one end of the shaft 30, and the grip portion 33 for holding the shaft and the stopper member 37 for preventing the movement of the shaft 30 are provided at the other end of the shaft 30.

Tool Portion

Figure 9:
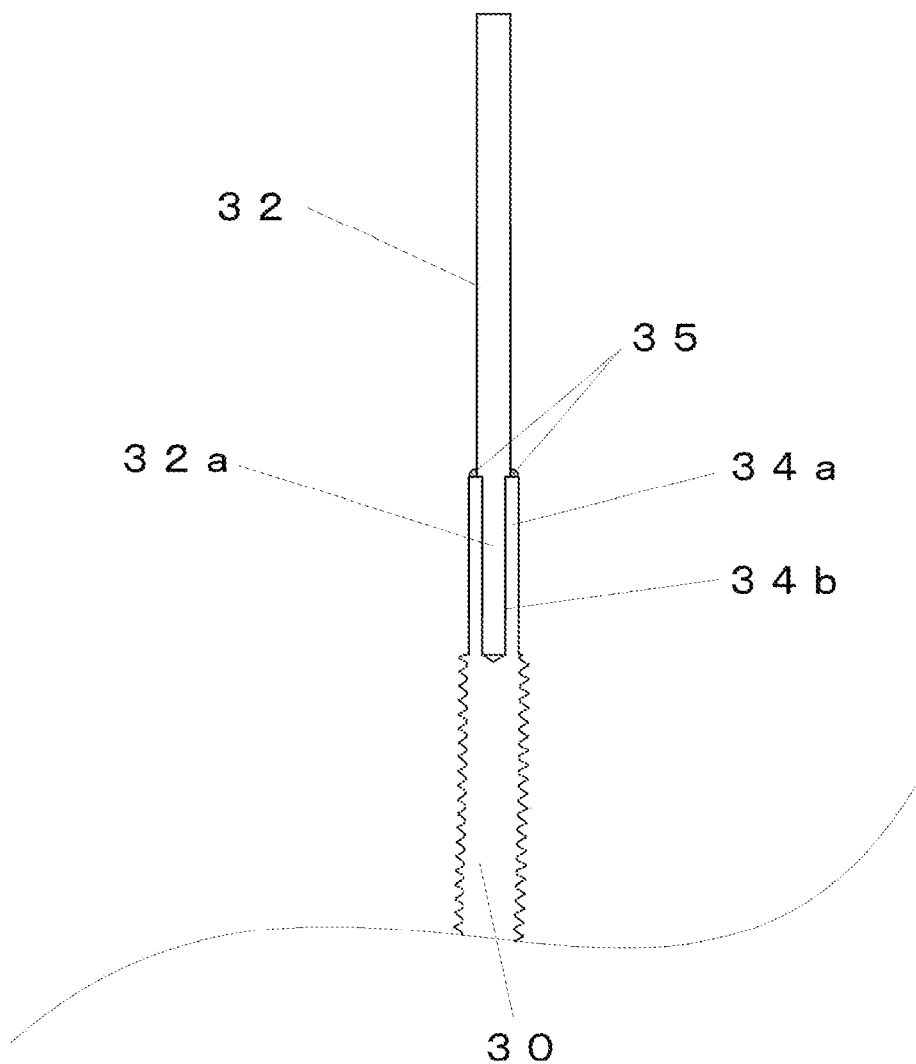
FIG. 9 is a diagram showing a fixing method for the tool portion according to the second embodiment.

As shown in FIG. 9, the tool portion 32 is formed separately from the shaft 30 and can be attached and fixed to the shaft 30. Accordingly, after screwing the shaft 30 and the exterior body 20 to each other and attaching the tool portion to the one end of the protruding shaft 30, it is possible to use a long tool portion that cannot pass through the exterior body 20.

As shown in FIG. 9, a fixing method for the tool portion may be a method of inserting the tool portion 32 into a tool connecting portion 34 having an opening formed at any depth in a longitudinal direction from the one end of the shaft 30, and fixing the tool portion 32 by adhesion.

However, the fixing method for the tool portion 32 described in the present embodiment is an example, and all general methods used for fixing such as press fitting and welding may be included.

Figure 10:
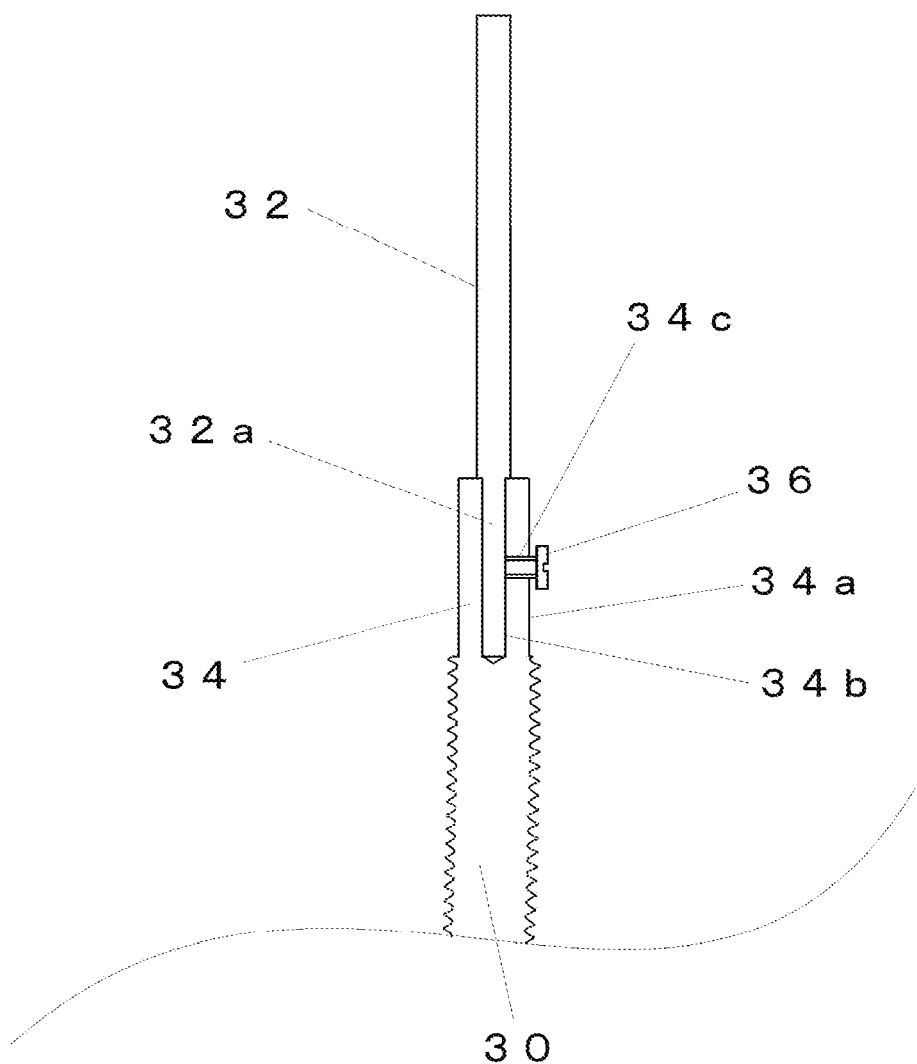
FIG. 10 is a diagram showing a fixing method in which the tool portion according to the second embodiment is removable.

As shown in FIG. 10, the tool portion 32 is formed separately from the shaft 30 and can be configured to be detachable from the shaft 30. Accordingly, when using tool portions with different shapes continuously or when using disposable or frequently replaced tool portions, the tools can be easily replaced and convenience is improved.

As shown in FIG. 10, an attaching/detaching method for the tool portion may be a method of providing a through hole 34c in the tool connecting portion 34, having the opening formed at any depth in the longitudinal direction from the one end on the tool side of the shaft 30, from a lateral direction of the shaft 30, inserting the tool portion 32 into the tool connecting portion 34 through the opening, and then inserting a tool fixing screw 36 into the through hole 34c for fixation.

In addition, the attaching/detaching method for the tool portion may be a method of providing a modified hole with a structure that allows an urging spring or ball to move on a tip surface of the shaft, forming a groove or hole for accommodating the urging spring or ball on an outer circumference at any position at one end not for the work of the tool portion 32, which is formed separately from the shaft 30, and holding the tool portion by pushing the tool portion into the modified hole.

In addition, the attaching/detaching method for the tool portion may be a method of machining an end face of the shaft 30 on the tool side into a three-piece chuck shape, forming a male screw on an outer circumference of the chuck, inserting the tool portion into the chuck, and then tightening a nut-shaped member to the male screw on the outer circumference of the chuck, so as to fix the tool portion.

However, the attaching/detaching methods for the tool portion described in the present embodiment are examples, and any general method used for attachment/detachment is included.

Figure 11:
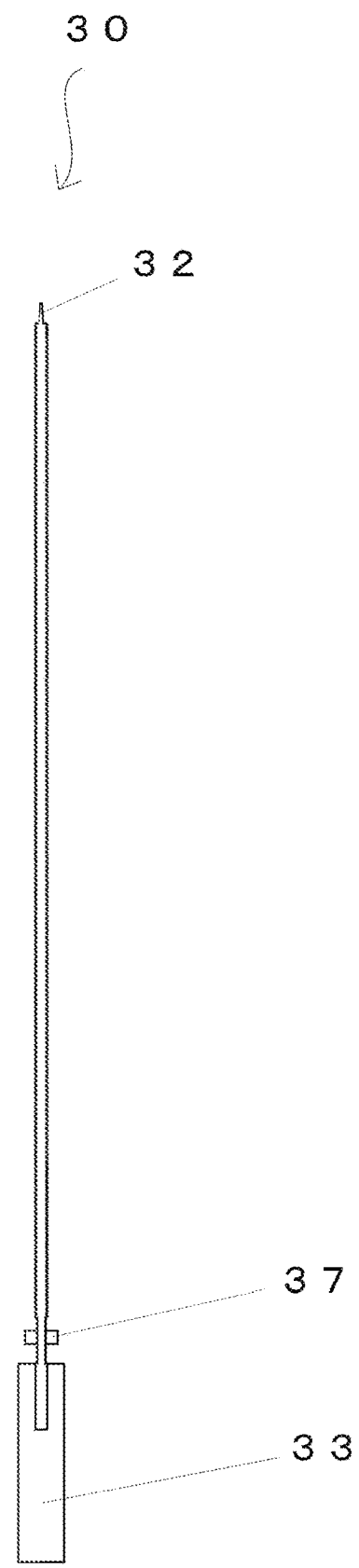
FIG. 11 is a diagram showing the entire shaft according to the second embodiment with which a tool portion is integrally formed.

As shown in FIG. 11, the tool portion 32 may be integrally formed with the shaft 30. Accordingly, when using a short tool that can pass through the exterior body 20 without replacement, by integrally forming the tool portion having a required shape at the one end of the shaft, it is possible to provide the tool portion at a low cost.

In addition, other than the present embodiment, the tool portion 32 described in the present embodiment can be appropriately modified and implemented without changing the gist of the invention.

Third Embodiment

Next, a third embodiment according to the invention will be described in detail with reference to FIGS. 12 to 14A and 14B. The items common to the first and second embodiments may be omitted.

Overall Configuration of Rotation Tool

The overall configuration of a rotation tool 100 according to the present embodiment will be described below.

Figure 12:
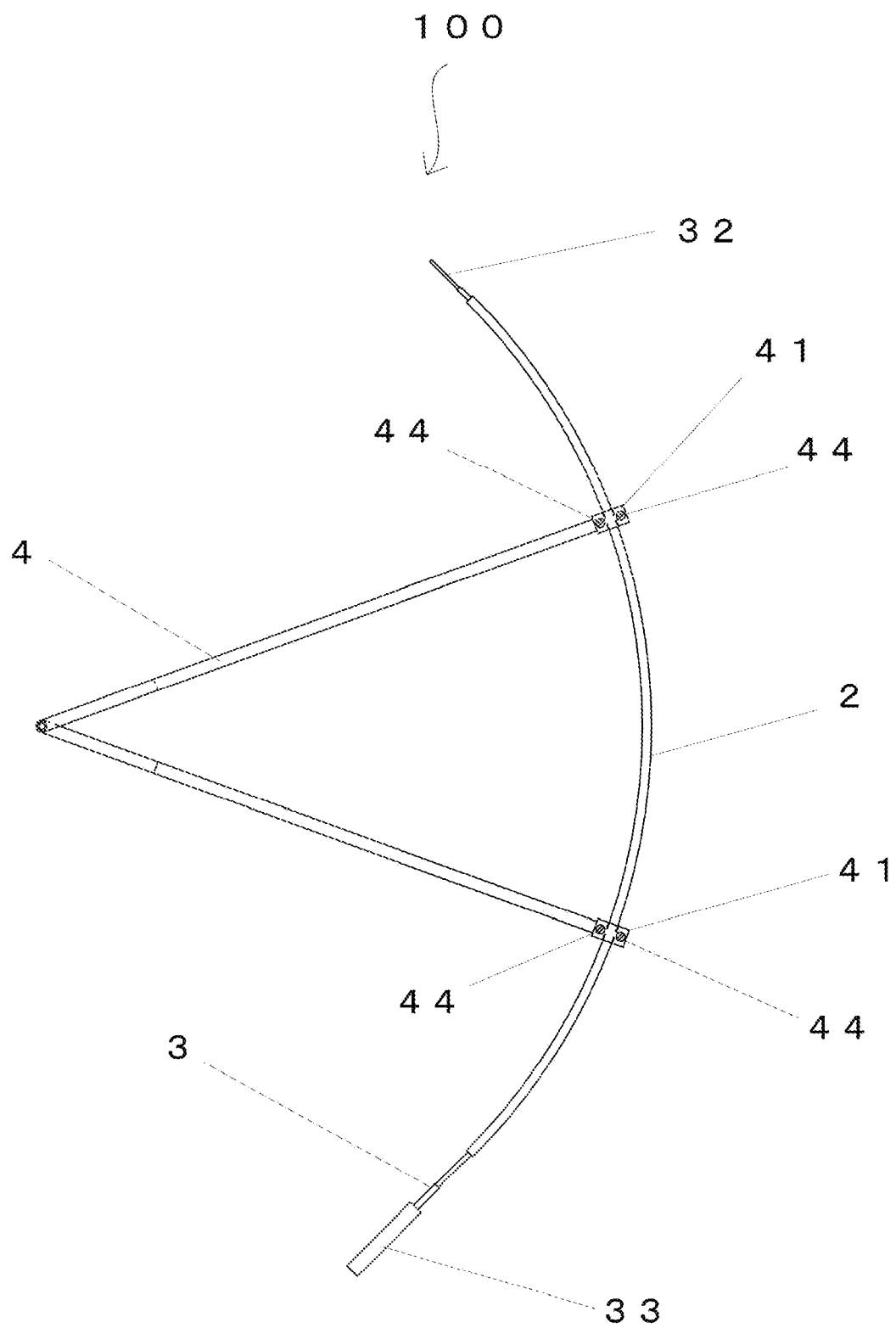
FIG. 12 is a diagram showing an entire rotation tool according to a third embodiment.
Figure 13:
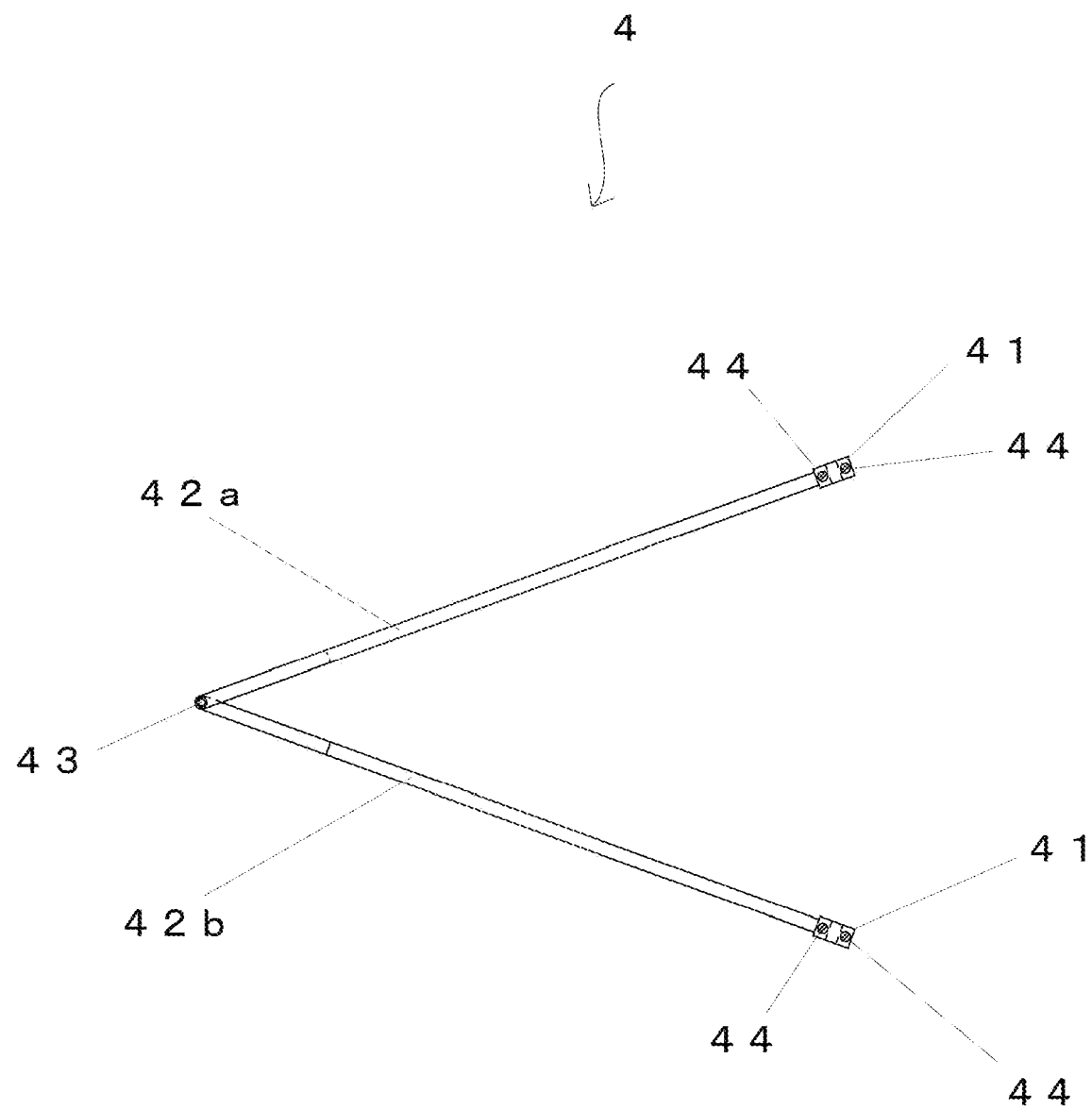
FIG. 13 is a diagram showing a detachable holding member according to the third embodiment.
Figure 14A:
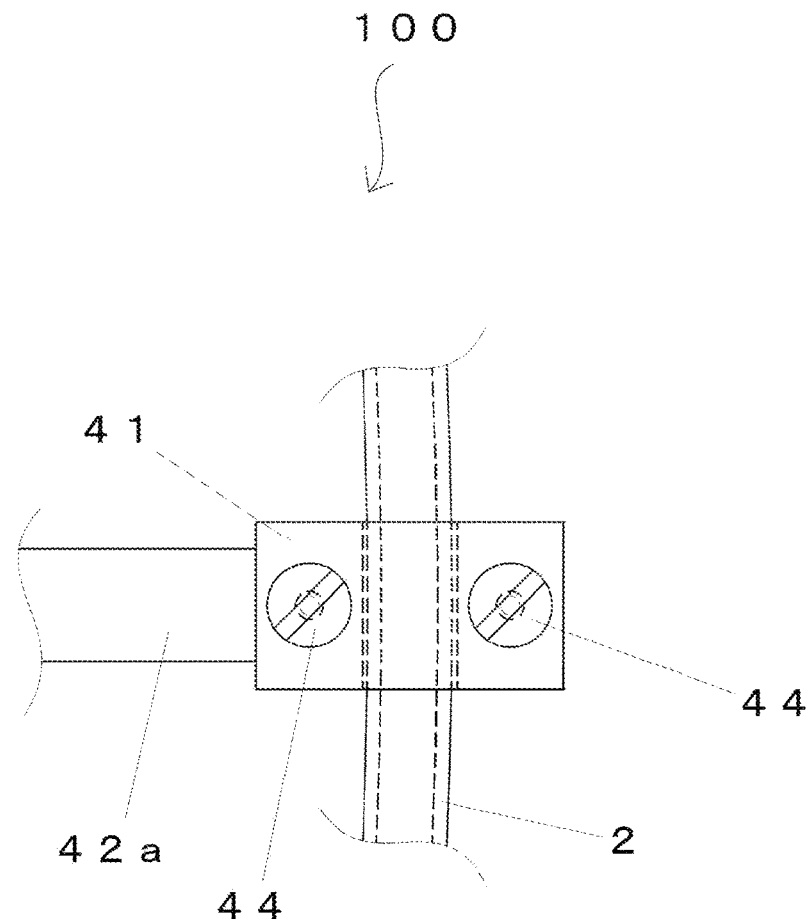
FIGS. 14A and 14B are diagrams showing a fixing method for the holding member according to the third embodiment.
Figure 14B:
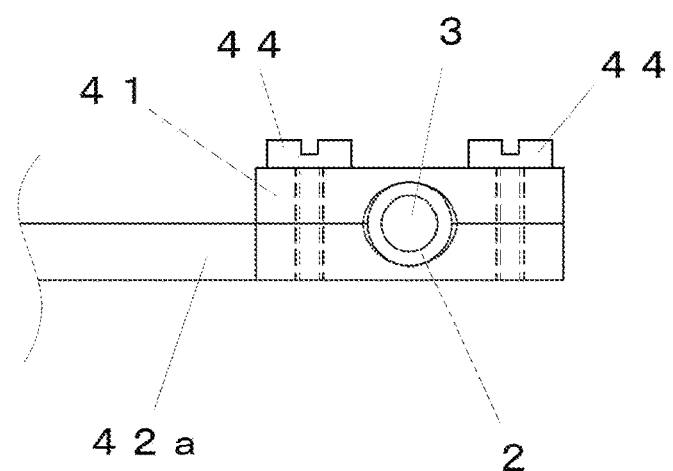

FIG. 12 shows a state of the rotation tool 100 according to the present embodiment in which the exterior body 2 and the shaft 3 are screwed to each other, the tool portion 32 and the grip portion 33 protrude from the exterior body 2, and a holding member 4 is attached to an outer circumference of the exterior body 2. In addition, FIG. 13 is a diagram showing only the holding member 4, and FIGS. 14A and 14B are diagrams showing details of a connection portion between the holding member 4 and the exterior body 2.

As shown in FIG. 12, the rotation tool 100 includes the exterior body 2, the shaft 3, and the holding member 4. Hereinafter, each configuration of the rotation tool 100 according to the present embodiment will be described.

Exterior Body and Shaft

The exterior body 2 and the shaft 3 in the present embodiment can be obtained by appropriately modifying the exterior body 2 or the exterior body 20 and the shaft 3 or the shaft 30 described in the first embodiment or the second embodiment without changing the gist of the invention, and therefore, the descriptions thereof in the present embodiment will be omitted.

Holding Member

As shown in FIGS. 12 and 13, the holding member 4 includes holding member fixing portions 41 that can be attached to any positions of the exterior body 2, arm portions 42 formed in a size capable of holding the rotation tool 100, a shaft portion 43 that connects the plurality of arm portions and is rotatably provided according to fixing positions of the holding member fixing portions 41, and holding member fixing screws 44 for fixing the holding member fixing portions 41. Hereinafter, each configuration of the holding member 4 will be described.

Holding Member Fixing Portion

As shown in FIGS. 14A and 14B, the holding member fixing portion 41 is provided at one end of the arm portion 42, and may include a recess for sandwiching the exterior body 2 and a pair of fixing members with through holes for holding the holding member fixing screw 44.

The holding member fixing portion 41 can be connected to and fixed to the exterior body 2 by sandwiching the exterior body 2 in the recesses and fitting the holding member fixing screw 44 in the through hole.

It is desirable that the recess of the holding member fixing portion 41 has a shape corresponding to the curvature of the curved portion of the exterior body 2. Accordingly, an attachment position of the holding member can be changed optionally, and can be adjusted according to applications and preference of users.

Arm Portion

As shown in FIGS. 12 and 13, the arm portion 42 includes one or more long member arms, and is provided with the holding member fixing portion 41 at one end thereof.

It is desirable that an intermediate portion of the arm portion 42 is a cylinder. Accordingly, it is possible to secure a certain level of strength and improve the ease of holding.

However, the shape and dimensions of the arm portion 42 can be appropriately changed in consideration of the curvature and dimensions of the exterior body 2, the ease of holding, and the like.

Shaft Portion

When the arm portion 42 includes two or more arms, the shaft portion 43 can be provided at one end different from a holding member fixing portion 41 side.

It is desirable that the shaft portion 43 connects the arm portions to each other and each arm is configured to be rotatable around the shaft portion 43. Accordingly, an angle between two or more arms can be changed as appropriate, and can be adjusted according to applications and preference of users.

The configuration and shape of the holding member, the fixing method, etc. described in the present embodiment are examples, and can be appropriately modified without changing the gist of the invention.

In addition, it is possible to appropriately replace components in the above-described embodiments with well-known components without departing from the gist of the invention, and each embodiment and each modification mentioned above may be appropriately combined.

What is claimed is:

1. A rotation tool comprising:
   a flexible shaft including a tool portion at one end and a grip portion at the other end; and
   a cylindrical exterior body including a curved portion on at least a part thereof, wherein
   a spiral protrusion is formed on at least a part of the shaft and a spiral groove is formed on at least a part of the curved portion, and the shaft is configured to be movable inside the exterior body by screwing the spiral protrusion and the spiral groove to each other, and
   wherein a pitch in the spiral groove increases as being far away from a center point of a curvature of the curved portion.

2. The rotation tool according to claim 1, wherein when the spiral protrusion and the spiral groove are screwed to each other, respective threads facing each other are formed at any same inclination angle.

3. The rotation tool according to claim 1, wherein
   when the spiral protrusion and the spiral groove are screwed to each other, respective threads facing each other are formed at any same inclination angle.

4. The rotation tool according to claim 1, wherein the tool portion is formed to be detachable from the shaft.

5. The rotation tool according to claim 1, wherein the tool portion is formed integrally with the shaft.

6. The rotation tool according to claim 1, wherein a stopper member configured to prevent a movement of the shaft is provided on at least one of the shaft and the exterior body.

7. The rotation tool according to claim 1, wherein
   the tool portion is formed to be detachable from the shaft, and
   a stopper member configured to prevent a movement of the shaft is provided on at least one of the shaft and the exterior body.

8. The rotation tool according to claim 1, wherein a detachable holding member is provided at any position on an outer circumference of the exterior body.

9. The rotation tool according to claim 1, wherein the spiral groove is formed from both ends of the exterior body to any length, and the spiral groove is not provided in an intermediate portion of the exterior body.

10. The rotation tool according to claim 1, wherein
    the spiral groove is formed from both ends of the exterior body to any length, and the spiral groove is not provided in an intermediate portion of the exterior body.

11. The rotation tool according to claim 1, wherein
    when the spiral protrusion and the spiral groove are screwed to each other, respective threads facing each other are formed at any same inclination angle, and
    the spiral groove is formed from both ends of the exterior body to any length, and the spiral groove is not provided in an intermediate portion of the exterior body.

12. The rotation tool according to claim 1, wherein
    when the spiral protrusion and the spiral groove are screwed to each other, respective threads facing each other are formed at any same inclination angle, and
    the spiral groove is formed from both ends of the exterior body to any length, and the spiral groove is not provided in an intermediate portion of the exterior body.

* * * * *